United States Patent
Jennen et al.

(10) Patent No.: US 7,315,699 B2
(45) Date of Patent: Jan. 1, 2008

(54) OPTICAL DEVICE FOR EXTRACTING A SIDEBAND SIGNAL FROM A COMPOSITE SIGNAL INCLUDING ORTHOGONALLY MODULATED SIGNALS

(75) Inventors: Jean Gerardus Leonardus Jennen, Huizen (NL); Kyriakos Vlachos, Athens (GR)

(73) Assignee: Lucent Technologies Inc., Murray Hill, NJ (US)

( * ) Notice: Subject to any disclaimer, the term of this patent is extended or adjusted under 35 U.S.C. 154(b) by 620 days.

(21) Appl. No.: 10/832,156

(22) Filed: Apr. 26, 2004

(65) Prior Publication Data

US 2005/0238363 A1    Oct. 27, 2005

(51) Int. Cl.
*H04B 10/06* (2006.01)
(52) U.S. Cl. .................. 398/205; 398/202; 398/205; 385/11; 385/123; 356/345; 356/351
(58) Field of Classification Search ............ 398/152, 398/65, 184–185, 95–99, 11, 202–205; 385/11, 385/95–99
See application file for complete search history.

(56) References Cited

U.S. PATENT DOCUMENTS

| 5,054,922 | A  | * | 10/1991 | Kersey ...................... 356/477 |
| 5,060,312 | A  | * | 10/1991 | Delavaux .................... 398/204 |
| 5,274,490 | A  | * | 12/1993 | Tsushima et al. ........... 398/204 |
| 7,167,651 | B2 | * | 1/2007  | Shpantzer et al. ............ 398/77 |
| 2004/0071472 | A1 | * | 4/2004 | Ito ............................. 398/161 |

(Continued)

OTHER PUBLICATIONS

D. J. Blumenthal, et al. "All-Optical Label Swapping with Wavelength Conversion for WDM-IP Networks with Subcarrier Multiplexed Addressing", IEEE Photonics Technology Letters, vol. 11, No. 11, Nov. 1999, pp. 1497-1499.

(Continued)

*Primary Examiner*—Kenneth Vanderpuye
*Assistant Examiner*—Phyowai Lin (57) ABSTRACT

An optical device extracts an information bearing sideband such as an FSK or SCM signal (label) from a composite signal that includes the sideband and an orthogonally modulated signal such as an intensity modulated signal (payload) by splicing the composite signal into a polarization maintaining fiber at a desired angle so that the composite signal is separated into two orthogonal polarizations that experience differential group delay in the fiber. The polarized output signals from the fiber are then coupled to a polarization beam splitter at an equivalent or complementary angle to the desired angle so that one sideband of the composite signal appears at a first output of the beam splitter while another sideband appears at a second output of the beam splitter. The sidebands can then be converted to an electrical data signal by using an appropriate receiver, such as a balanced receiver for FSK signals. In one embodiment of the present invention, an input polarization beam splitter is coupled to the polarization maintaining fiber which, in turn, is coupled to an output polarization beam splitter. The coupling at each end of the fiber is made at approximately 45° to one polarization axis of the fiber. The fiber is characterized by a beat length $L_{beat}$ and the fiber is designed to have a length substantially equal to $(L_{beat} \times f_c)/2\delta f$, wherein the sidebands of the composite signal are separated by a wavelength difference $\delta f$ and $f_c$ is the nominal center frequency of the composite signal. This device has been shown to be useful for extracting GMPLS LSC level wavelength labels from either an FSK/IM composite signal or an SCM/IM composite signal.

12 Claims, 6 Drawing Sheets

U.S. PATENT DOCUMENTS

2004/0258377 A1* 12/2004 Berkey et al. .............. 385/123
2006/0274318 A1* 12/2006 Jensen et al. ............... 356/477

OTHER PUBLICATIONS

H. J. Lee, "A Simple All-Optical Label Detection and Swapping Technique Incorporating a Fiber Bragg Grating Filter", IEEE Photonics Technology Letters, vol. 13, No. 6, Jun. 2001, pp. 635-637.

T. Koonen, et al. "Optical Packet Routing in IP-Over-WDM Networks Deploying Two-Level Optical Labeling", Proc. of ECOC '01, Paper Th. L. 2.1, Sep. 30, 2001.

Sulur, "Combined ASK/FSK and ASK/DPSK Modulation Formats for Optically Labeled Signals", Proc. ONDM '2002, Feb. 4, 2002.

R. Hui et al., "PMD-Insensitive SCM Optical Receiver Using Polarization Diversity", IEEE Photonics Technology Letters, vol. 14, No. 11, Nov. 2002, pp. 1632-1634.

S. J. Ben Yoo, "High-Performance Optical-Label Switching Packet Routers and Smart Edge Routers for the Next-Generation Internet", IEEE Journal on Selected Areas in Communications, vol. 21, No. 7, Sep. 2003, pp. 1041-1051.

K. Vlachos, "An Optical IM/FSK Coding Technique for the Implementation of a Label-Controlled Arrayed Waveguide Packet Router", Journal of Lightwave Technology, vol. 21, No. 11, Nov. 2003, pp. 2617-2628.

\* cited by examiner

OPTICAL DEVICE FOR EXTRACTING A SIDEBAND SIGNAL FROM A COMPOSITE SIGNAL INCLUDING ORTHOGONALLY MODULATED SIGNALS

BACKGROUND OF THE INVENTION

1. Field of the Invention

This invention relates to an optical device for extracting information carried in sidebands or tones within a composite signal exhibiting multiple types of signal modulation and, more particularly, to an optical device adapted to extract optically either a frequency shift keying (FSK) modulated signal from a composite FSK/IM (intensity modulated) signal or a sub-carrier modulation (SCM) signal from a composite SCM/IM signal.

2. Description of the Related Art

Data networks and optical networks are converging in an attempt to evolve the optical Internet of the future. As such, future optical data communication links are likely to operate on burst mode traffic as opposed to the regular, periodic traffic found in conventional time-division-multiplexed (TDM) networks. In order to handle the burst mode traffic efficiently, asynchronous connections will replace synchronous connections between network nodes in the optical data networks such as packet switched networks.

One promising technique for implementing these packet switched networks involves putting the data arranged in an internet protocol (IP) format or in any other kind of packet format directly onto an optical wavelength division multiplexed (WDM) channel. This technique avoids any involvement with the Synchronous Digital Hierarchy (SDH) and Asynchronous Transfer Mode (ATM) transport layers. IP-over-WDM is supported by an optical multi-protocol label switching protocol (MPLS) formerly known as MPλS protocol, an optical multi-protocol wavelength switching protocol and now part of Generalized Multi-Protocol Label Switching (GMPLS) particularly with reference to the Lambda-Switched Capable (LSC) level.

Generalized Multiprotocol Label Switching (GMPLS) is the next-generation implementation of Multiprotocol Label Switching (MPLS). GMPLS extends the functionality of MPLS to include a wider range of label-switched path (LSP) options for a variety of network devices. GMPLS labels and LSPs can be processed at four levels. The levels are Fiber-Switched Capable (FSC), Lambda-Switched Capable (LSC), Time Division Multiplexing Switched Capable (TDM), and Packet-Switched Capable (PSC).

According to the GMPLS protocol at the LSC level, wavelength-switched channels can be established in a similar way as label-switched paths in the conventional MPLS protocol. In GMPLS systems, packets can be marked with an optical label that can be swapped in every network node. Thus, end-to-end optical paths can be set up along which the data can be routed transparently through the network. Currently, several label marking techniques for optical label switching have been investigated and two techniques of interest herein are Subcarrier Multiplexing (SCM) and Frequency Shift Keying (FSK).

Figure 1:
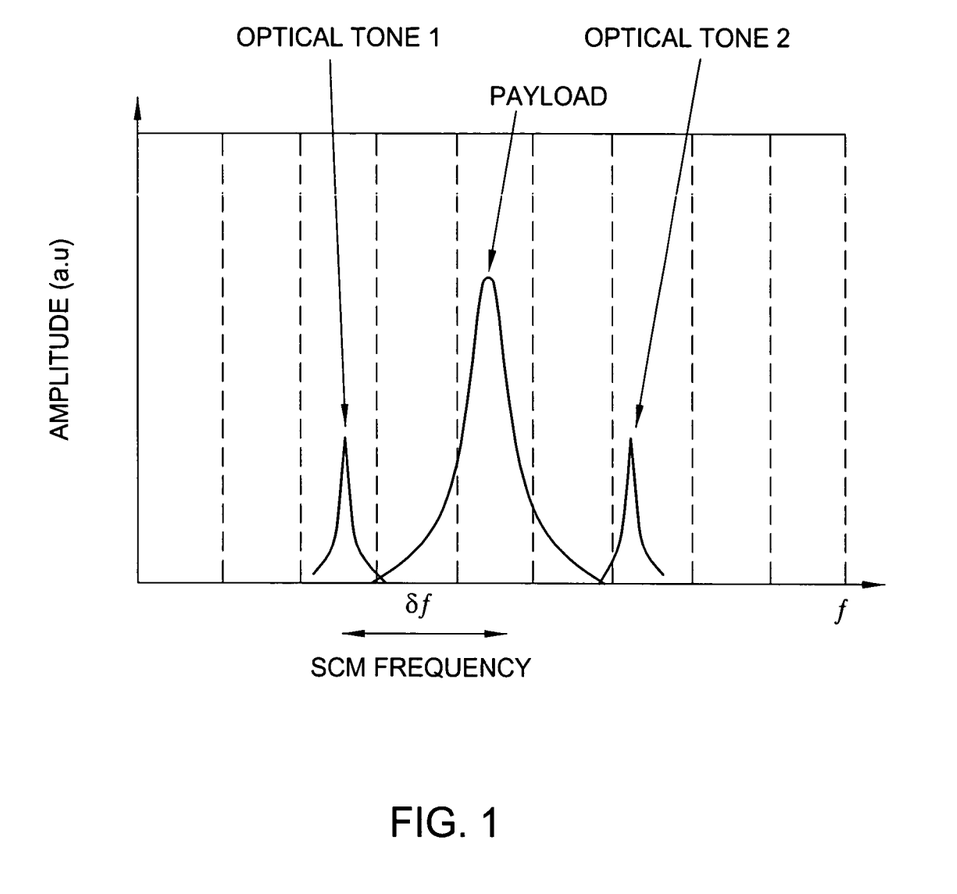
FIG. 1 shows an exemplary optical spectrum for an optical channel bearing SCM modulated information together with IM information.
Figure 2:
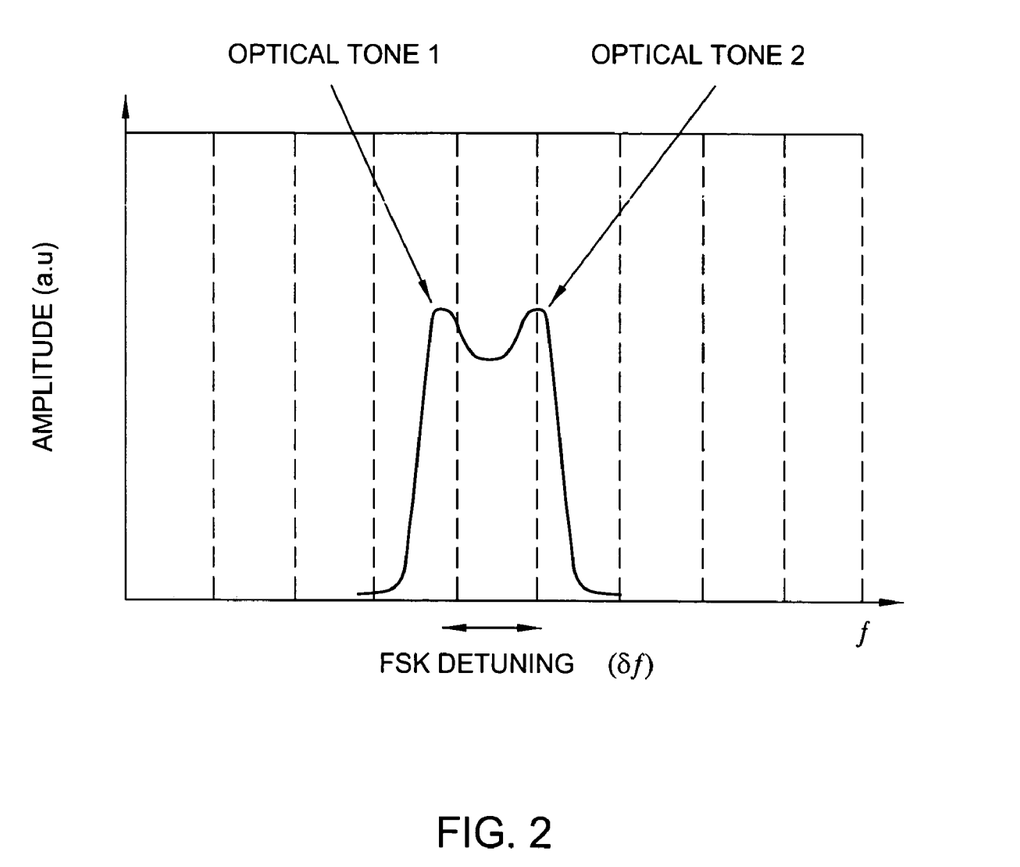
FIG. 2 shows an exemplary optical spectrum for an optical channel bearing FSK modulated information together with IM information.

In both label marking techniques considered for optical label switching, label data is modulated as two optical frequencies (generally called optical tones) symmetrically distributed about a central optical frequency $f_c$ (generally known as the channel frequency or carrier frequency). The payload of packet data is modulated, generally by an intensity modulation technique such as amplitude shift keying (ASK), onto the optical signal in the region at or around the central optical frequency. An exemplary composite optical signal bearing the payload in the central portion of the composite signal and the label in the sidebands of the composite signal is shown in FIGS. 1 and 2 for the SCM and FSK label marking techniques, respectively, on an IM payload.

At each network node, it is necessary only to process the optical label that encapsulates all switching and routing information for the packet, while the payload portion of the optical packet remains unaffected in the optical domain. Processing has been carried out in exemplary systems by using optical filters tuned to the label and payload optical frequencies. This technique however has several disadvantages, namely, the loss of optical power, the duplication of components for each operation, and the need for tuning. Optical power is lost because the incoming signal is split between two paths—one for the label processing and one for the payload processing. The processing operation in each path necessarily discards the unwanted signal (label or payload) while extracting the wanted portion. Tuning to the channel frequency must be maintained at the correct optical frequency, whether for the FSK tones or the SCM sidebands. If the center frequency is changed to a different WDM channel, the optical filters must be retuned in a difficult and slow process.

Fiber Bragg gratings have been suggested for use in label extraction by exploiting the reflection and transmission functions of the gratings. This approach is considered lossless in the sense that the fiber Bragg grating has two output ports that one can match with the label optical frequency and the payload frequency. But the suppression ratio depends mainly on the manufacturing process. Current grating designs provide adequate, but not ideal, suppression ratios. It should be noted that grating designs have a finite suppression ratio which can be adequate for detection. This suppression can be, for example, −30 dB to −45 dB and depends on the manufacturing process, materials used and other design parameters.

The techniques discussed above do not exhibit efficiency in separating labels from packet payloads in a lossless way and they do not yield adequate extinction ratios between the two optical label tones in the case of FSK. Whether using optical filters or Bragg gratings to realize the label and payload separation function, one is required to tune the payload and label separation devices precisely to each new WDM channel. When the WDM system requires different channel spacing, the payload and label separation devices must be retuned to the new channel frequencies even though the spacing of FSK tones or SCM sidebands remains the same regardless of WDM channel spacing as with ITU channels, for example. There is no known technique for simply realizing a device that exhibits a periodic filtering function that would filter the label tones without retuning to the new WDM channel frequency.

SUMMARY OF THE INVENTION

Simplicity of design, periodic filtering, improved extinction ratios, and substantially lossless operation are all achieved in an optical device that extracts an information bearing sideband such as an FSK or SCM signal (e.g., a label signal) from a composite signal that includes the information bearing sideband and an orthogonally modulated signal such as an intensity modulated signal (e.g., a payload signal) in accordance with the principles of the present invention by splicing the composite signal into a polarization maintaining fiber at a desired splice angle so that the composite signal is separated into two orthogonal polarizations that experience differential group delay via the birefringence of the fiber. The polarized output signals from the fiber are then further processed by judicious coupling to a polarization beam splitting element at an equivalent or complementary angle to the desired splice angle so that one sideband of the composite signal appears at a first output of the beam splitting element while another sideband appears at a second output of the beam splitting element. The sidebands can then be converted to an electrical data signal by using an appropriate receiver such as a balanced receiver for FSK signals. In experimental practice, this device has been shown to be useful for extracting optical labels from either an FSK/IM composite signal or an SCM/IM composite signal.

In one embodiment of the present invention, an input polarization beam splitter is coupled to the polarization maintaining fiber which, in turn, is coupled to an output polarization beam splitter. The coupling at each end of the fiber is made at approximately 45° to one polarization axis of the fiber. The fiber is characterized by a beat length $L_{beat}$ and the fiber is designed to have a length substantially equal to $(L_{beat} \times f_c)/2\delta f$, wherein the sidebands of the composite signal are separated by a predetermined wavelength difference $\delta f$ and $f_c$ is the nominal center frequency of the composite signal, that is, of the optical channel. These tones can then be supplied to the inputs of an appropriate receiver to completely recover the label.

Another embodiment providing substantially lossless performance is realized by utilizing both output ports of the input polarization beam splitter. The output ports of the input polarization beam splitter are each coupled to separate polarization maintaining fibers which, in turn, are each coupled to separate output polarization beam splitters. Optical signals representing the separated tones (two output signals per tone) are supplied by the four output ports of the output polarization beam splitters to a receiver. One FSK receiver arrangement comprises a double balanced receiver coupled to a transimpedance amplifier, whereas the other FSK receiver arrangement comprises a single balanced receiver coupled to a transimpedance amplifier. In the latter arrangement, common output signals from the output polarization beam splitters are combined in an optical coupler or a polarization beam splitter before being supplied to the single balanced receiver. The coupler would introduce a 3 dB loss whereas the polarization beam splitter would introduce no additional loss.

BRIEF DESCRIPTION OF THE DRAWINGS

A more complete understanding of the invention may be obtained by reading the following description of specific illustrative embodiments of the invention in conjunction with the appended drawings in which.

It is to be noted, however, that the appended drawings illustrate only typical embodiments of this invention and are therefore not to be considered limiting of its scope, for the invention may admit to other equally effective embodiments. Where possible, identical reference numerals have been inserted in the figures to denote identical elements.

DETAILED DESCRIPTION

The present invention is directed to the extraction or separation of information contained in one or more sidebands of a composite signal in which multiple groups of information are optically modulated orthogonally to form the composite signal in an optical channel. Examples of such composite signals include but are not limited to SCM/IM signals and FSK/IM signals. In the former case as shown in FIG. 1, the dual sidebands contain sub-carrier modulated information wherein each sideband is located $\delta f$ from the center frequency of the channel, $f_c$. In the latter case as shown in FIG. 2, the dual sidebands contain frequency shift keying information (label) wherein each sideband is located $\delta f/2$ from the center frequency of the channel, $f_c$. It should be understood by those skilled in the art that the payload for FSK/IM is an intensity modulated signal occurring across the sidebands. In the SCM examples that are useful in GMPLS systems, the sidebands contain the label information whereas the IM signal situated about the center frequency of the channel contains the payload information.

It should be noted, at this point, that wavelength and frequency are used interchangeably throughout the specification and claims and the terms are related by the expression $f=c/\lambda$, where c is the speed of light in a vacuum or in a material. In addition, the frequency difference is related to the wavelength difference approximately as follows: $\delta f \approx c \delta \lambda / \lambda^2$, where $\delta f << f$.

Sidebands are understood to represent separately modulated information groups that are displaced from the center frequency of the channel by a specific frequency amount. In the optical packet-switched network example described above relating to IP over WDM using GMPLS, the sidebands contain wavelength label information that is useful to the nodes of the data switching network. The payload information is generally concentrated about the center frequency of the channel by using a form of intensity modulation such as amplitude shift keying or the like. In the description that follows, the terms "sidebands", "tones", and "label" or "label signal" may be used interchangeably to denote the same concept.

In the description below, it should be noted that the exemplary configuration of the optical filter in combination with the receiver is optimized for FSK/IM and SCM optical systems. In this device, extraction of the sideband information can be loss-less for the two optical sideband frequencies with ideal extinction when applied to either FSK or SCM data. Ideal suppression ratio between the rejected payload frequency and the sidebands is achieved for SCM. For FSK, ideal suppression between the two sidebands is achieved. The device also exhibits a periodic transmission function which makes the optical device attractive for use at any operating wavelength on an n-$\delta f$ grid that also has the desired sideband frequency spacing.

In the description of the present invention presented below, the exemplary embodiments of the invention will be explained generally in reference to an IP over WDM packet switched system employing GMPLS where the wavelength label is modulated orthogonally to the payload in sidebands of the composite signal as shown in FIGS. 1 and 2. The exemplary modulation described below is FSK for the label. This description is intended to be illustrative, but not limiting, of the uses for this invention.

Figure 3:
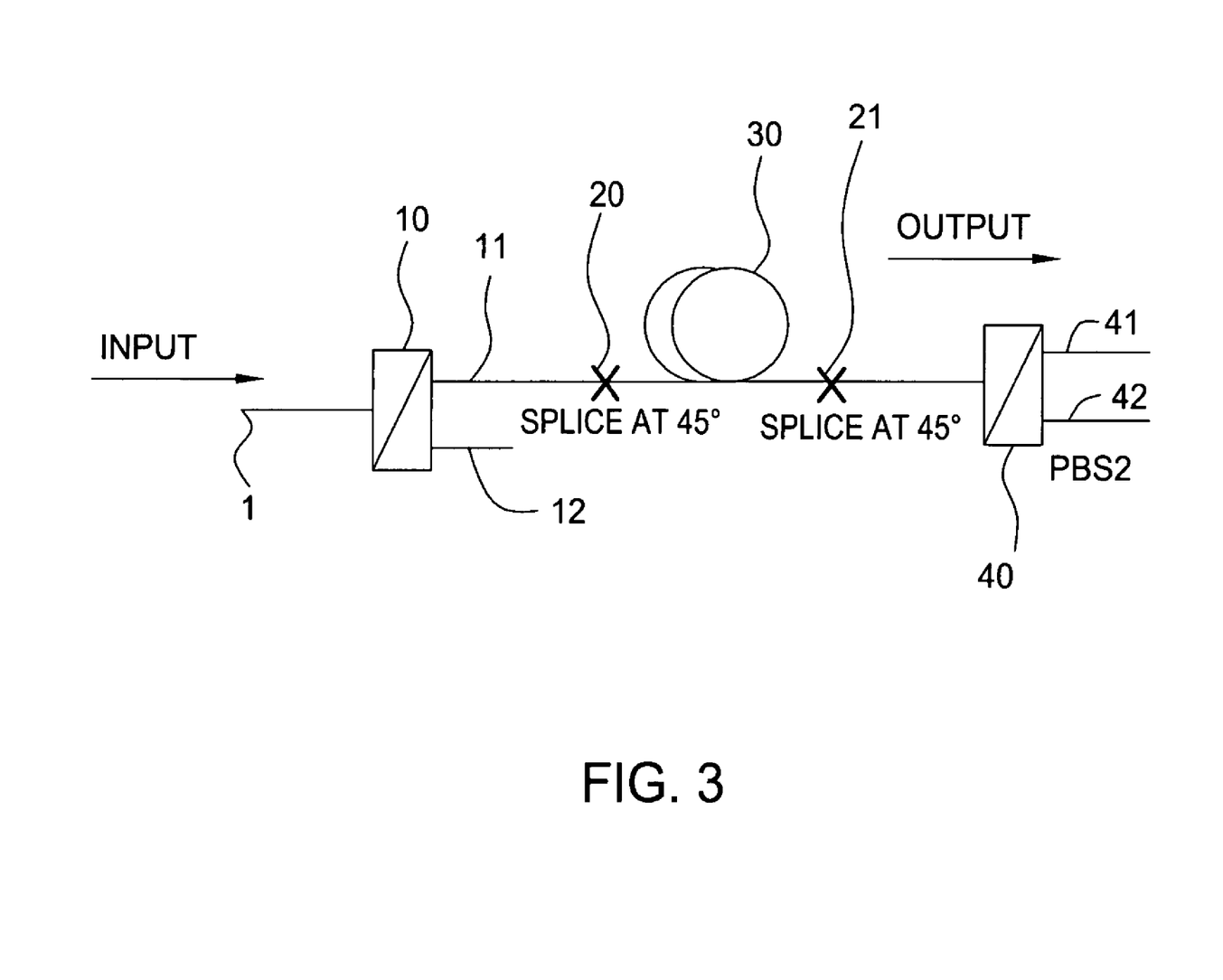
FIGS. 3 through 6 depict alternate embodiments of optical devices realized in accordance with the principles of the present invention.

In order to achieve efficient label detection in accordance with the principles of the present invention, it is possible to use an optical filter comprising a polarization maintaining fiber coupled at preferred input and output coupling angles together with input and output polarization beam splitting elements as shown in FIG. 3. The optical filter shown in FIG. 3 performs an optical extraction of the label information residing in the sidebands of the composite signal. The optical filter includes input and output polarization beams splitters (elements 10 and 40, respectively) coupled to a prescribed length of polarization maintaining fiber (element 30) at preferred coupling angles at the fiber input and output (reference numerals 20 and 21, respectively).

Polarization beam splitters are well known in the art. They are characterized by two output ports that supply one or two orthogonal polarizations of an input signal. If the input signal is confined to a single polarization, then the output signal will appear at only one of the output ports corresponding to that polarization.

It is assumed that the composite signal can vary in polarization. That is, the composite signal is not strictly constrained to a TE or TM optical polarization. When the composite signal is input at input 1 to polarization beam splitter 10, the composite signal will be separated into its constituent TE and TM polarizations. Unless the input polarization of the composite signal is controlled prior to polarization beam splitter 10 or happens to be in a single polarization state, some portion of the signal will possibly be separated by polarization beam splitter 10 and appear at the unused output port 12. This will reduce the power of the signals available at the filter output (output ports 41 and 42) over the optimum case where the composite signal is input to polarization beam splitter 10 in a single polarization so that it appears only at output port 11.

Input and output ports for each of the polarization beam splitters are understood to include a short length of optical fiber called a pigtail. In an example from experimental practice, it is preferable to have the pigtails realized by polarization maintaining fiber.

As shown in FIG. 3, the filter includes L meters of polarization maintaining fiber 30 coupled to two polarization beam splitters 10 and 40 with their axes spliced at a preferred coupling angle of 45° with respect to the axes of the polarization maintaining fiber. Input polarization beam splitter 10 is used for aligning the incoming light in a single polarization to the desired coupling angle of 45° at the polarization maintaining fiber, whereas the output polarization beam splitter 40 is used to selectively process the orthogonal signals traveling on the two axes of the polarization maintaining fiber and output the separate sidebands at different output ports of splitter 40. By coupling fiber 30 to the input port of polarization beam splitter 40 at a preferred angle of 45° to the polarization axes of the fiber, it is possible to add and subtract the related orthogonal vector components of the two signals on both polarization axes of the fiber due to the 45° rotation in coupling between the fiber and polarization beam splitter 40.

Coupling between the fiber and the input and output beam splitters is shown by reference numerals 20 and 21. The coupling can be formed by any type of splice or hardware optical coupler known in the art. It is desirable to minimize the amount of loss introduced by the couplings. The preferred angle of coupling is 45° to the fiber axes. In experimental practice, it has been determined that the coupling angles at splices 20 and 21 should be equal in magnitude and opposite in sign. That is, if splice 20 is at a 45° angle to the polarization axes of the fiber, then splice 21 should be at a −45° angle to the polarization axes of the fiber. It is contemplated that the invention can be realized by coupling angles that deviate from ±45°, although such a deviation will result in reduced performance due to crosstalk between the sidebands within the filter. Also, it is contemplated that, if the splices are equal but not oppositely signed, the output ports for supplying the different sidebands of the label will be reversed.

The transmission function for each output port of the optical filter shown in FIG. 3 is sinusoidal due to the different propagation constants, $\beta_x$ and $\beta_y$, of the two axes of the polarization maintaining fiber 30. The transmission function of the filter as seen at output port 41 of polarization beam splitter 40 is represented as follows:

$$T = \frac{P_{output}}{P_{input}} = 2\cos^2\left[\frac{(\beta_y - \beta_x)L}{2}\right]. \quad (1)$$

The transmission function of output port 42 of polarization beam splitter 40 is in the same form with a π phase shift.

Free spectral range of the filter, $2\delta\lambda$, is calculated by taking into account that the dependence on the beat length of the polarization maintaining fiber. For the calculation of the free spectral range, one must take into account the constructive interference of the signals that emerges as the output signal from one output port of polarization beam splitter 40 and the destructive interference of the signals that emerges as the output signal from the other output port of polarization beam splitter 40. If $L_{beat}$ is the beat length of fiber 30, then the wavelengths that constructively interfere are spectrally spaced by the free spectral range of the filter:

$$2\delta\lambda = \frac{L_{Beat}\lambda}{L}. \quad (2)$$

where the beat length is calculated as:

$$L_{Beat} = \frac{2\pi}{\Delta\beta} = \frac{2\pi}{\Delta n} \cdot \frac{\lambda}{2\pi} = \frac{\lambda}{\Delta n}, \quad (3)$$

and where $\Delta\beta$ is difference of the propagation constants and $\Delta n$ is the difference of the refractive indices for the orthogonal axes of the polarization maintaining fiber.

As mentioned above, the filter together with a balanced receiver is well suited for optical packet-switched networks where the label information is marked using the FSK optical tones. The maximum of the filter transmission function for output port 41 is tuned to one tone or sideband of the composite signal while the maximum of the filter transmission function for output port 42 is tuned to the second tone. In the FSK label example, the FSK tones or sidebands are spectrally spaced by $\delta\lambda/2$. This is feasible because the free spectral range $2\delta\lambda$ of the filter depends on the length of the fiber. This can be understood with an example from experimental practice in which the two FSK tones are spectrally spaced by 20 GHz. For typical commercially available polarization maintaining fiber having a typical beat length of 3 mm, it is possible to construct a filter with 40 GHz free spectral range using 14.531 meters of fiber 30. One FSK tone will appear at output port 41 and the other FSK tone will appear at output port 42.

Figure 4:
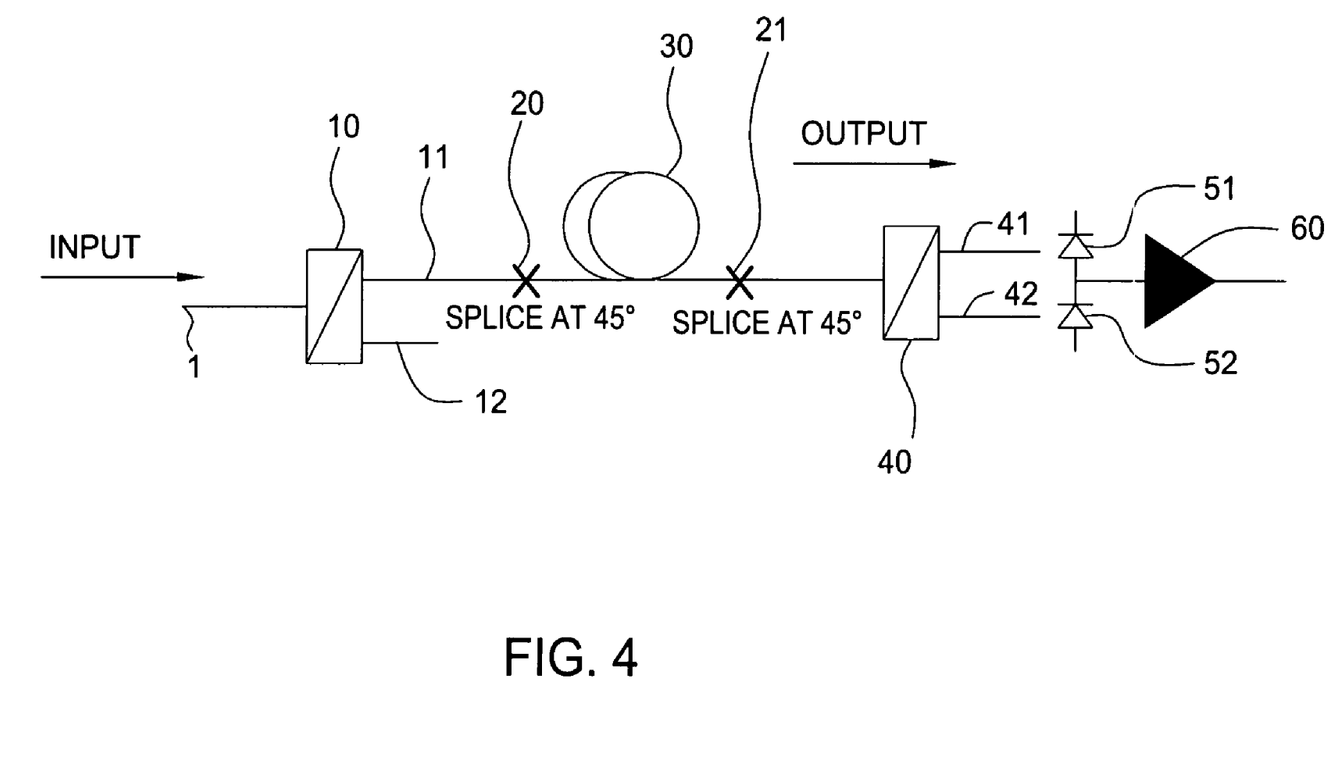

The balanced receiver shown in FIG. 4 together with the optical filter in FIG. 3 comprises photodiodes 51 and 51 and transimpedance amplifier 60. The photodiodes are coupled together in a balanced arrangement as shown with an input to the amplifier 60 connected between the photodiodes. Each photodiodes is disposed to receive a signal from only one of the output ports of polarization beam splitter 40. As shown in FIG. 4, output port 41 is optically coupled to photodiode 51 whereas output port 42 is optically coupled to photodiode 52. The optical signals from output ports 41 and 42 are subtracted from each other and result in an AC-coupled data stream that is the data representation of the reconstructed label.

It is understood by persons skilled in the art that the use of SCM modulation for the wavelength label requires an SCM receiver coupled to the filter as opposed to the balanced receiver shown in FIG. 4. SCM receivers are well known in the art. Since SCM sidebands carry the same information, an effective receiver will add the sidebands as they emerge from the polarization beam splitter ports.

Figure 5:
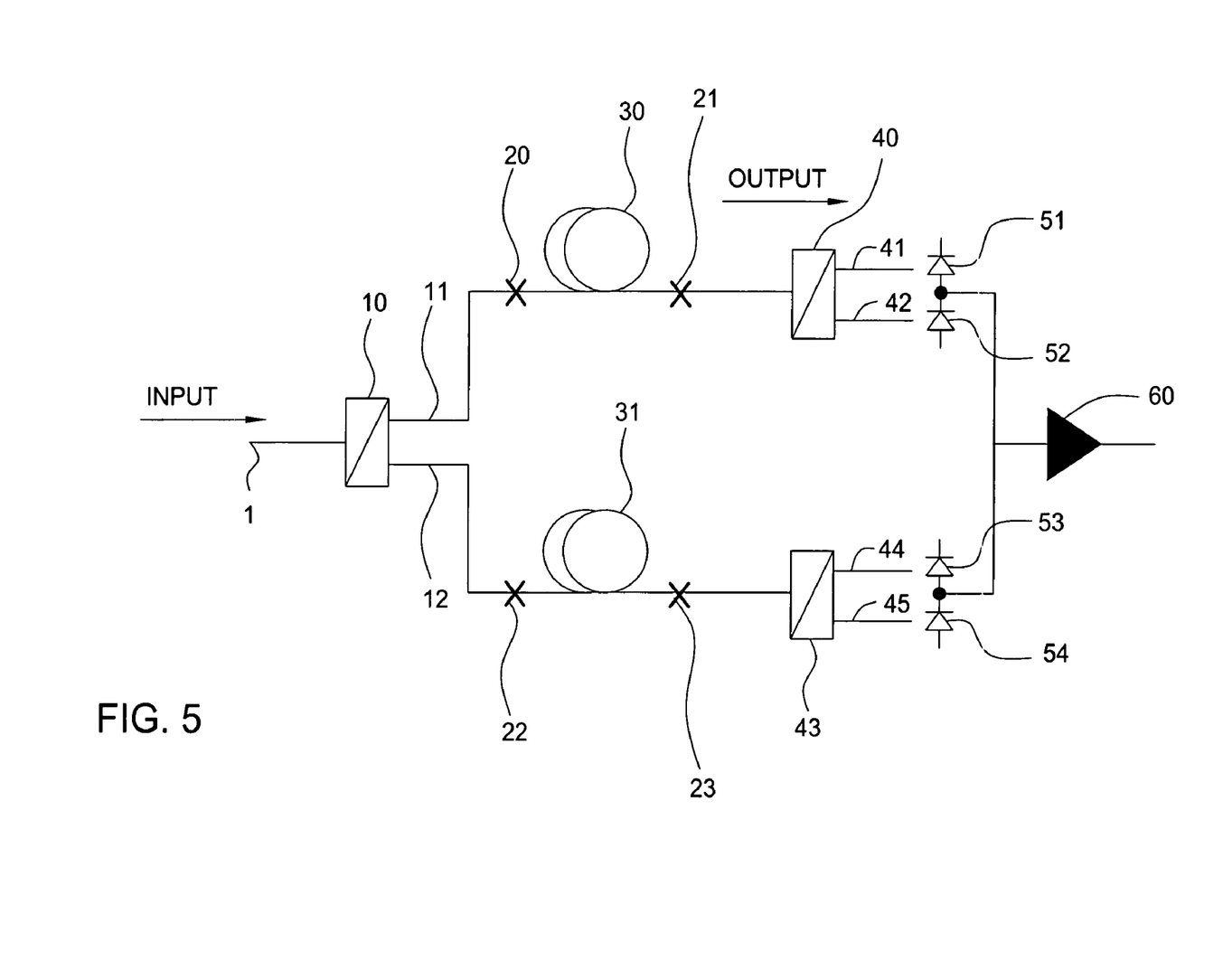
Figure 6:
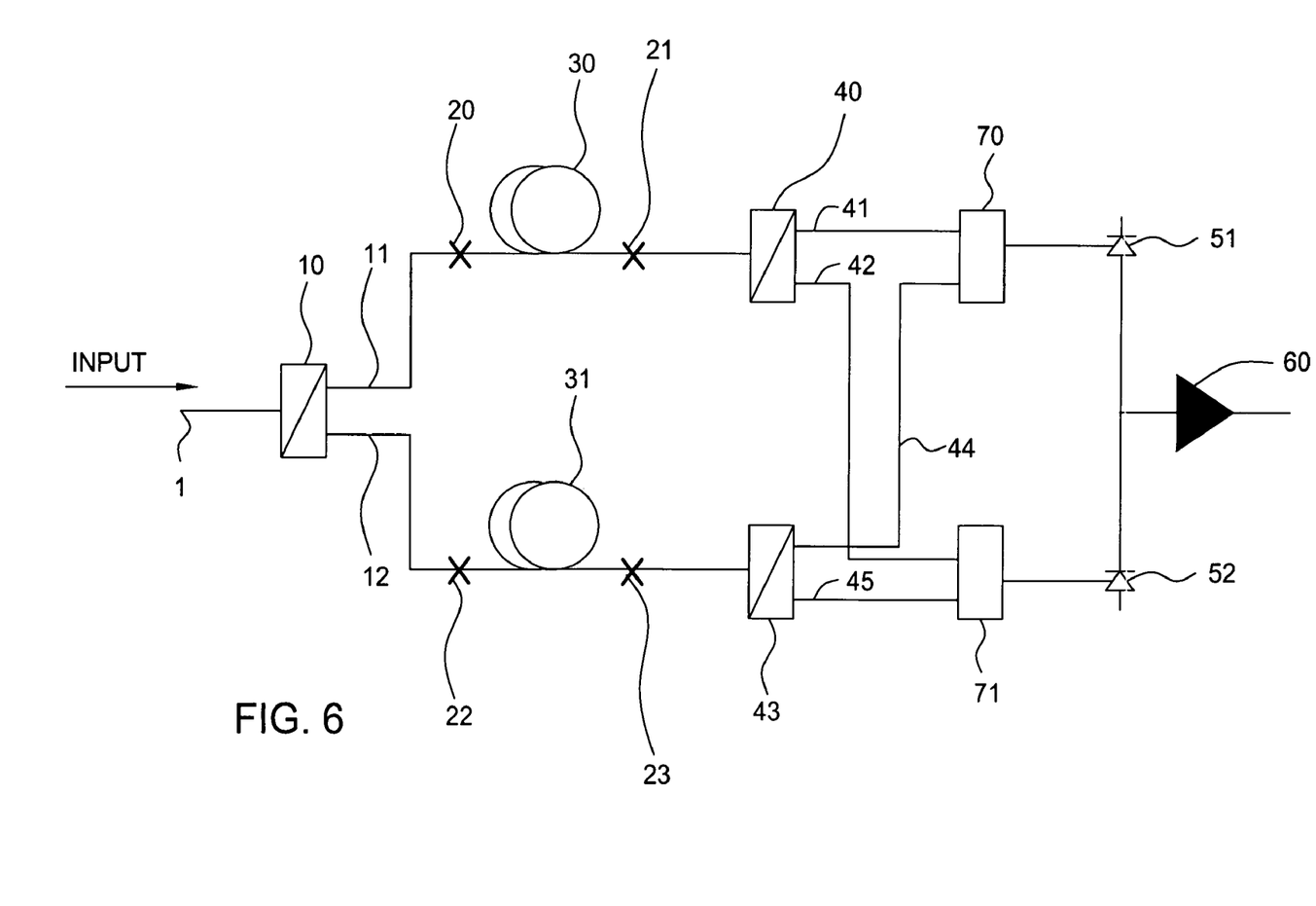

Enhancement of the filter shown in FIGS. 3 and 4 is possible by replicating the first fiber path in a second fiber path between output port 12 and a second output polarization beam splitter 43 as shown in FIGS. 5 and 6. This arrangement is both lossless and input polarization independent. That is, in the case where the polarization of the incoming composite signal is not aligned properly to the ordinary or fast axis of the input polarization beam splitter 10, the composite signal will be split and will emerge from output ports 11 and 12. As discussed for the earlier arrangement shown in FIGS. 3 and 4, this results in power loss and in a decrease of receiver sensitivity. However, when both output ports of polarization beam splitter 10 are used as shown in FIGS. 5 and 6, the entire input signal is used to recover the label thereby retaining the power and significantly enhancing receiver sensitivity. Lossless detection is achieved with only a modest increase in filter and receiver complexity.

In FIG. 5, a double balanced receiver is used after the optical filter to complete the recovery of the label from the FSK sidebands. The double balanced receiver comprises four photodetectors 51 through 54 arranged as separate balanced receivers connected to a transimpedance amplifier 60. One balanced receiver is optically coupled to the output ports of polarization beam splitter 40 while the other balanced receiver is optically coupled to the output ports of polarization beam splitter 43. At the double balanced receiver, the optical signals from output ports 41 and 44 are added, just as the optical signals from output ports 42 and 45 are added together. The resulting sum signals are then subtracted to form the recovered label at the output of amplifier 60.

In FIG. 6, the receiver is simplified to a single balanced receiver while optical elements are employed to sum optically the appropriate signals supplied to the receiver by the output polarization beam splitters 40 and 43. In this filter, the two components of the same optical frequency of the FSK tone are combined in the optical domain. Summation is accomplished using any of a number of known optical combining techniques such as fused fiber couplers or optical combiners or polarization beam splitters where the two output ports serve as inputs for combining the signals. In experimental practice, the latter is preferred because it is substantially lossless and because the whole filter will consist only of polarization maintaining fiber and polarization maintaining fiber pigtailed components resulting in a fully stable device that is insensitive to the polarization state of the incoming composite signal.

Combining elements 70 and 71 are supplied with the appropriate signals from polarization beam splitter 40 and polarization beam splitter 43. As shown in FIG. 6, combining element 70 is supplied with the optical signals relating to the same sideband from output ports 41 and 44 whereas combining element 71 is supplied with the optical signals relating to a different sideband from output ports 42 and 45. The output of each combining element is then optically coupled into a related photodiode of the single balanced receiver.

One significant advantage of the present filter, as described above, is that the filtering function is periodic in the spectrum, unlike the function of a typical optical filter or typical fiber Bragg grating. This means that the filters shown in FIGS. 3 though 6 can be used for any wavelength channel that is related to $\delta\lambda$, the SCM frequency or FSK detuning. For example, in the case of FSK with 10 GHz detuning, by realizing the device for $2\delta\lambda$ equivalent to 20 GHz, the filter operates for any channel having, for example, 50 GHz, 100 GHz or 200 GHz spacings. No specialized tuning is required. One FSK sideband of the label will always arrive at one output port of polarization beam splitter 40 or one of each of the output ports of splitters 40 and 43, and the other FSK sideband of the label will always arrive at the other output port of polarization beam splitter 40 or the other one of each of the output ports of splitters 40 and 43 regardless of the central wavelength (frequency) of the optical channel. This presents an important advantage over other filter designs because it requires no tuning when the input wavelength is changed.

Other important advantages of the filter or filter/receiver combination are that it offers a high suppression ratio that is nearly ideal, because of the sinusoidal transmission function. The dual fiber designs exhibit substantially no power loss in the sense that label and payload is separated and both optical sidebands are detected. This permits the use of balanced optical detection which significantly enhances the overall receiver sensitivity.

While the foregoing is directed to embodiments of the present invention, other and further embodiments of the invention may be devised without departing from the basic scope thereof, and the scope thereof is determined by the claims that follow. It is contemplated that the present invention can be used to separate the payload from the label, either from one or both sidebands (tones).

The invention claimed is:

1. An optical device for extracting first and second optical streams of data from an optical signal at a wavelength $\lambda_c$ wherein the data streams are separated by a predetermined wavelength difference $\delta\lambda$, the device comprising:

an input polarization beam splitter having both an input port for receiving said optical signal and at least one output port defined by a predetermined polarization state;

a polarization maintaining fiber having a primary polarization axis, the fiber being coupled to both the at least one output port of the input polarization beam splitter at a predetermined angle to the primary polarization axis and an input port of an output polarization beam splitter at a second angle to the primary polarization axis, the second angle being related to the predetermined angle, the fiber being characterized by a beat length $L_{beat}$, wherein the fiber has a length substantially equal to $(L_{beat} \times \lambda_c)/2\delta\lambda$; and the output polarization beam splitter having both said input port and first and second output ports defined by substantially orthogonal polarization states, the first and second optical data streams output from the first and second output ports, respectively, of the output polarization beam splitter.

2. The optical device as defined in claim 1 wherein the predetermined angle is substantially equal in magnitude and opposite in sign to the second angle.

3. The optical device as defined in claim 2 wherein the data streams are components of a data signal received with said optical signal as FSK modulation thereon.

4. The optical device as defined in claim 3 for extracting said data signal, the device further comprising:
   a balanced optical receiver optically coupled to the first and second output ports of the output polarization beam splitter for combining the first and second optical data streams to generate the data signal.

5. The optical device as defined in claim 2 wherein the data streams are components of a data signal received with said optical signal as sub-carrier modulated sidebands therein.

6. The optical device as defined in claim 5 further for extracting said data signal, the device further comprising:
   a combining element optically coupled tote first and second output ports of the output polarization beam splitter for combining the first and second data streams to generate the data signal.

7. An optical device for extracting first and second optical streams of data from an optical signal at a wavelength $\lambda_c$ wherein the data streams are separated by a predetermined wavelength difference $\delta\lambda$, the device comprising:
   an input polarization beam splitter having both an input port for receiving said optical signal and first and second output ports defined by substantially orthogonal polarization states;
   a first polarization maintaining fiber having a primary and secondary polarization axes, the fiber being coupled to both the first output port of the input polarization beam splitter at a predetermined angle to its primary polarization axis and an input port of a first output polarization beam splitter at a second angle to its primary polarization axis, the second angle being related to the predetermined angle;
   a second polarization maintaining (polarization preserving) fiber having a primary polarization axis, the fiber being coupled to both the first output port of the input polarization beam splitter at substantially the predetermined angle to its primary polarization axis and an input port of a second output polarization hewn splitter at substantially the second angle to its primary polarization axis;
   each fiber being characterized by a beat length $L_{beat}$, wherein each fiber has a length substantially equal to $(L_{beat} \times \lambda_c)/2\delta\lambda$; and
   the first and second output polarization beam splitters, each having both said input port and first and second output ports defined by said substantially orthogonal polarization states, the first and second optical data streams output from the first and second output ports, respectively, of each output polarization beam splitter.

8. The optical device as defined in claim 7 wherein the predetermined angle is substantially equal in magnitude and opposite in sign to the second angle.

9. The optical device as defined in claim 8 wherein the data streams are components of a data signal received with said optical signal as FSK modulation thereon.

10. The optical device as defined in claim 9 for extracting said data signal, the device further comprising:
    a first balanced optical receiver optically coupled to the first and second output ports of the first output polarization beam splitter for combining the first and second optical data streams to generate a first representation of said data signal;
    a second balanced optical receiver optically coupled to the first and second output ports of the second output polarization beam splitter for combining the first and second optical data streams to generate a second representation of said data signal; and
    means for combining the first and second representations of the data signal together to generate said data signal.

11. The optical device as defined in claim 9 further for extracting said data signal, the device further comprising:
    a first optical coupler for combining the first optical data streams from the first output port of each of said first and second output polarization beam splitter to generate a combined first optical data stream;
    a second optical coupler for combining the second optical data streams from the second output ports of each of said first and second output polarization beam splitter to generate a combined second optical data stream;
    a balanced optical receiver responsive to the first and second combined optical data streams for generating said data signal.

12. The optical device as defined in claim 7 wherein the data streams are carried on said optical signal as sub-carrier modulated sidebands.

* * * * *